April 10, 1956
H. PANCHERZ
2,741,294
APPARATUS AND METHOD OF MANUFACTURING RODS
OF GLASS FIBER-REINFORCED PLASTIC
Filed May 18, 1954
3 Sheets-Sheet 1
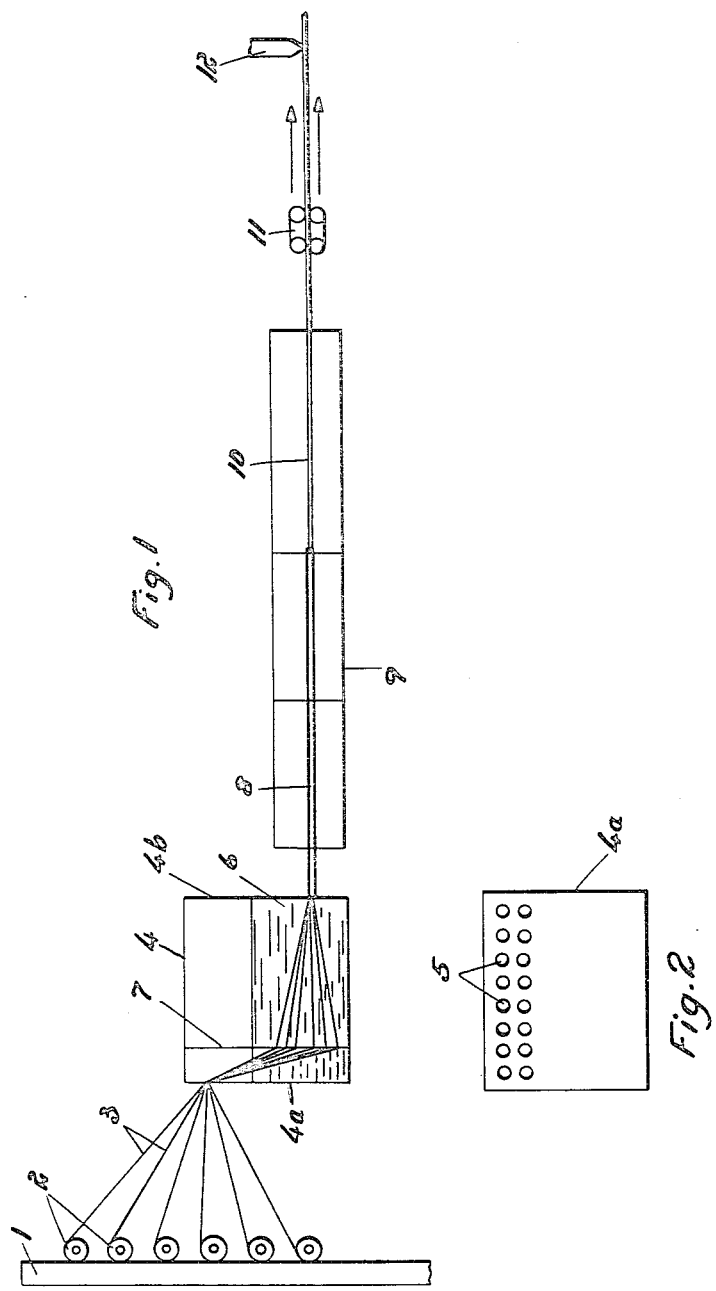
INVENTOR
HANS JOHANNES J. PANCHERZ
BY

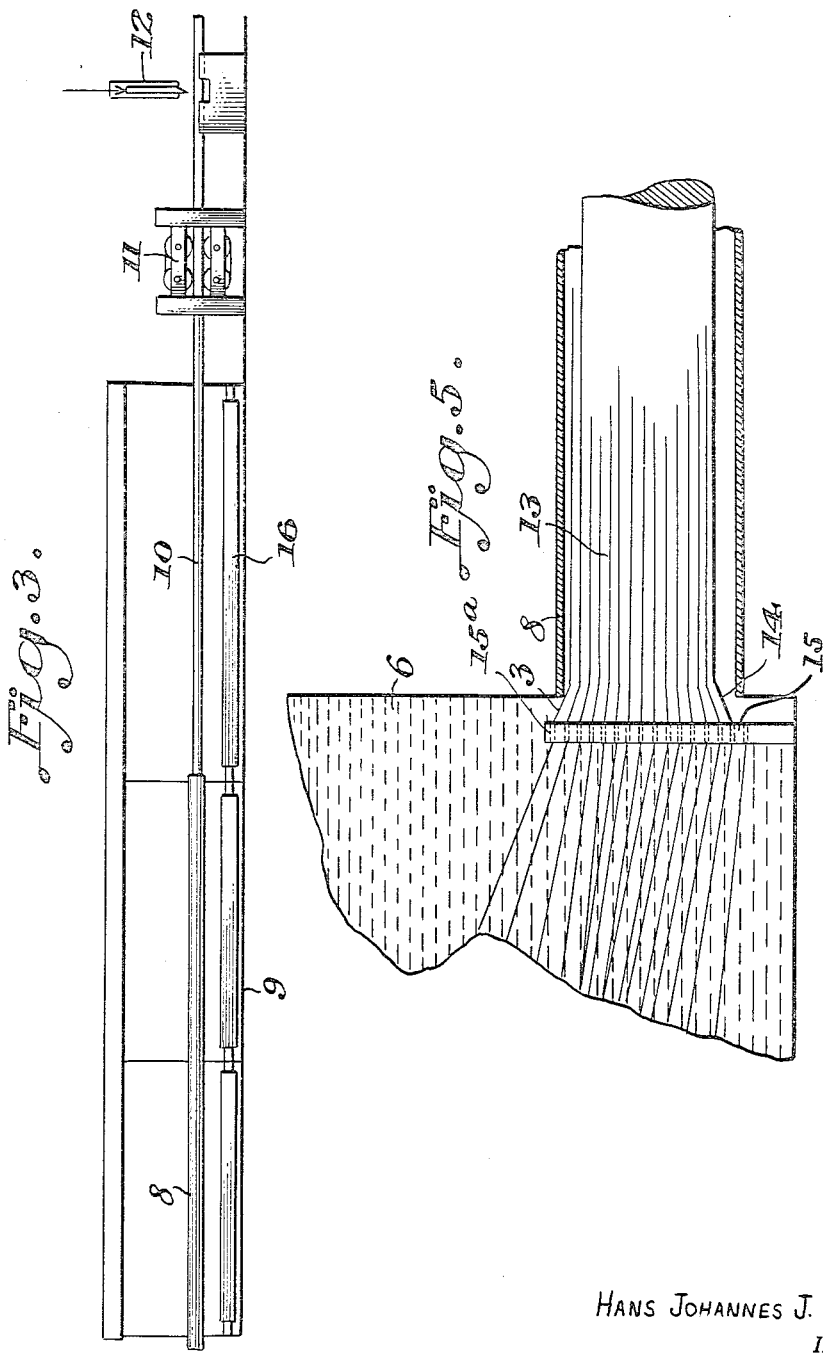

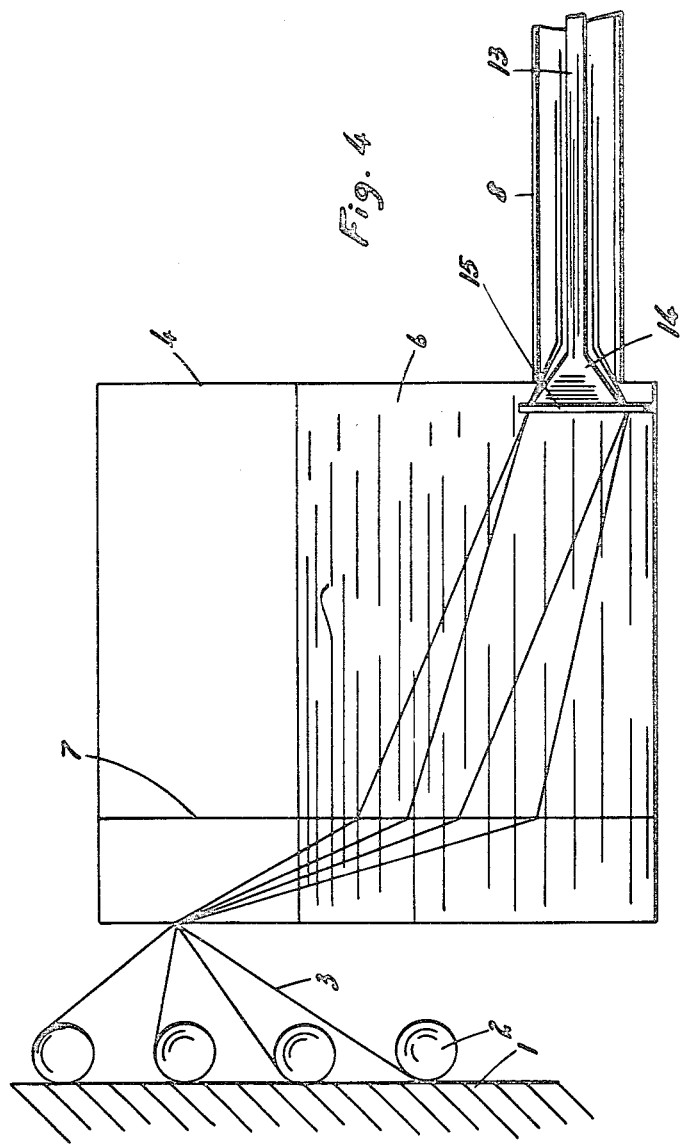

United States Patent Office 2,741,294
Patented Apr. 10, 1956

2,741,294

APPARATUS AND METHOD OF MANUFACTURING RODS OF GLASS FIBER-REINFORCED PLASTIC

Hans Pancherz, Malmo, Sweden

Application May 18, 1954, Serial No. 430,643

Claims priority, application Sweden May 28, 1953

4 Claims. (Cl. 154—1.7)

This invention relates to an improved method of manufacturing rods of glass fibre-reinforced plastic, especially fishing-rods for spinning.

The object of the invention is to provide a method by which rods of the type mentioned having improved strength and flexibility may be produced.

A further object of the invention is to provide a method by which rods of the said type and having improved and uniform strength and flexibility in all directions of bending may be produced efficiently and at a high rate.

The method of the invention is characterized in that a number of narrow bundles of assembled glass fibres are each wound off a spool mounted in a frame and are separately passed into a container filled with liquid plastic, in which they are soaked with plastic, that the fibre bundles lying side by side and with the fibres in parallel relationship and embedded in plastic are then drawn into a steel tube connected to the wall of the container and are moved forward within said tube while completely filling it, that heat is applied from the surroundings of the tube, and that a continuous rod consisting of the glass fibres and the hardened plastic is drawn out of the tube and cut into desired lengths.

A modification of this method is characterized in that the glass fibre bundles and the plastic surrounding them are drawn into the steel tube connected to the wall of the container, between said tube and a core located therein, which core at or in the vicinity of the inlet end of the tube is held against the pull exerted by the glass fibre bundles and the plastic but is otherwise freely suspended within the tube.

The invention will be described more in detail in the following, reference being had to the attached drawings, in which Fig. 1 shows a device for carrying out the method of manufacturing the glass fibre-reinforced rods;

Fig. 2 is a front elevation view of the front end wall of the container shown in Fig. 1;

Fig. 3 is an enlarged view of a portion of Fig. 1;

Fig. 4 shows a modification of this method, for making tubular rods, and

Fig. 5 is an enlarged view of a portion of Fig. 4.

In a frame 1 a number of spools 2 having narrow glass fibre bundles 3 wound thereonto are rotatably mounted on horizontal axles. The glass fibre bundles 3 each consisting of a great number of assembled (but not twisted) very thin glass fibres are wound off the spools and are directed into a container 4 through a corresponding number of openings 5 located at the top of front end wall 4a of said container. The container is filled with liquid plastic 6 of such a nature that it hardens in heat and is shaped only with the aid of the contact pressure in e. g. a mould, a so-called cast plastic. Such plastics may consist of unsaturated polyesters and (contrary to compression plastics) they harden comparatively slowly. The individual glass fibre bundles 3 pass from the openings 5 into the plastic bath so as to be soaked with the plastic, inasmuch as they are introduced through guide openings in the lower portion of a partition 7. From these guide openings the glass fibre bundles run continuously closer to each other in a direction towards the rear end wall 4b of the container 4 where the bundles, lying side by side as a single larger bundle of fibres with all fibres in parallel relationship and enclosed in plastic, are drawn into a horizontal steel tube 8 connected to said end wall. On assembling the individual fibre bundles into a large bundle of fibres, there arises between them and the surrounding plastic a lateral pressure for pressing out air that has followed the fibre bundles into the plastic bath. The use of a vacuum container or a similar special auxiliary device for removing the air thus becomes superfluous. In the tube 8, the glass fibre bundle and the plastic carried along with it completely fill out the cross-section of the tube and are thus subjected to a uniform contact pressure from the tube walls. The tube 8 is located in a sheet metal trough 9 having a removable cover and containing electric resistance elements 16 for supplying the heat required for the hardening of the plastic. The trough 9 is divided into three sections placed in a row and each provided with resistance means 16 and pertaining control means (not shown) permitting different temperatures to be kept in the various sections. Thus, for instance, the temperature in the first section may amount to 60° C., and in the second section to 110° C., and in the third section also to 110° C. The tube 8 terminates at the inlet into the third section of the trough 9, and the continuous rod 10 discharged therefrom and reinforced with glass fibres is subjected to a subsequent hardening in the third section. After leaving the third section of the trough, the rod passes through a drawing mechanism 11 which may comprise two endless movable V-belts. Said V-belts are pressed against the rod from opposite sides and pull it continuously forwards by friction. Finally, the rod is cut into desired lengths by means of a suitable cutting mechanism schematically shown at 12.

The rate at which the glass fibres and the continuous rod reinforced therewith are drawn forward is so adjusted that the hardening of the plastic is finished when the rod leaves the third section of the trough 9.

It should be observed that the feed of the rod through the tube 8 must be continuous and not intermittent as otherwise the rod would burn against the tube wall and stick thereto.

The method thus described makes it possible to obtain completely straight and parallel glass fibres in the rods so that the circular rods will have the same resistance moment against bending in all directions, an advantage which has not been realized with the prior art methods.

The method can of course be used for manufacturing rods of a great many other cross-sectional configurations than the circular one as the profile is determined by the cross-section of the tube 8.

The method also comprises a modification of the above described procedure, for manufacturing tubular rods. This modification will be described in the following with reference to Fig. 4 of the drawing. As in Fig. 1 a number of spools with wound-on glass fibre bundles 3 are rotatably mounted on horizontal axles in a frame 1. The glass fibre bundles wound off the spools 2 are also drawn into a container 4 filled with liquid plastic 6 that hardens in heat. The glass fibre bundles soaked with the liquid plastic are drawn from the container into a horizontal steel tube 8 connected to a wall of said container, between the tube and a steel core 13 located within said tube. Said core 13 has a conically widened portion 14 on that end which lies at or adjacent the inlet end of the tube 8, and is furthermore provided with a flange 15 located around the outer edge of said widened portion 14. The flange 15 carries one or more rows of holes 15a through each of which is led one of the glass fibre bundles 3, thereby providing for uniform distribution of said glass fibre bundles around the circumference of the core 13. The tube 8 may be secured to the bottom of the container 4 by means of the flange 15, but it may also be entirely free from any connection with the container. When the glass fibre bundles 3 and the adherent plastic are drawn in between the tube 8 and the core 13, they exert a pulling force on the core so that the conically widened portion 14 of the latter is pressed against the edge of the opening in the container to which the tube 8 is connected. The glass fibre bundles 3 thus run between the said widened portion 14 and said edge without however being hindered in their movement. Otherwise, the core 13 is freely suspended within the tube 8.

The supply of heat for hardening the plastic within the tube 8 and after its having left the latter, as well as the feed and cutting of the hardened, glass fibre-reinforced rod takes place in exactly the same manner as in the method according to Fig. 1.

It is obvious that the core 13 may be of any desired cross-section so that tubular rods with a through-hole of a cross-section other than circular may be manufactured.

What I claim and desire to secure by Letters Patent is:

1. A method of manufacturing rods of glass fibre reinforced plastic, comprising unwinding continuous glass fibres from supply spools, passing said fibres into and through a container filled with liquid plastic of the thermosetting low pressure curing type, assembling said fibres as a bundle impregnated with said plastic and moving said bundle into and through a molding tube extending from said container, supplying heat to said tube to initiate hardening of the plastic accompanying the glass fibre bundle within the same, drawing out from said tube a continuous rod consisting of said glass fibre bundle and plastic, supplying additional heat to said rod outside said tube to convert said plastic into an ultimately hardened condition, and cutting said rod into desired lengths.

2. A method of manufacturing rods of glass fibre reinforced plastic, comprising unwinding continuous glass fibres from supply spools, passing said fibres into and through a container filled with liquid plastic of the thermosetting low pressure curing type, assembling said fibres as a bundle impregnated with said plastic and moving said bundle into and through a molding tube extending from said container, between the wall of said tube and a core provided within said tube, supplying heat to said tube to initiate hardening of the plastic accompanying the glass fibre bundle within the same, drawing out from said tube a continuous tubular rod consisting of said glass fibre bundle and plastic, supplying additional heat to said rod outside said tube to convert said plastic into an ultimately hardened condition, and cutting said rod into desired lengths.

3. An apparatus for manufacturing rods of glass fibre reinforced plastic, comprising a number of glass fibre supply spools, mounting means for said spools, a container for containing liquid plastic, means for directing glass fibres delivered from said spools into said container, means in said container for assembling said glass fibres into a bundle, molding tube means associated with said container for receiving said glass fibre bundle at one end, means for heating said molding tube means to initiate hardening of plastic accompanying said glass fibre bundle therethrough, means for heating a rod formed from said glass fibre bundle and plastic leaving said molding tube means at the other end thereof, means for drawing said rod forward in a continuous operation, and means for cutting said rod into desired lengths.

4. An apparatus for manufacturing rods of glass fibre reinforced plastic, comprising a number of glass fibre supply spools, mounting means for said spools, a container for containing liquid plastic, means for directing glass fibres delivered from said spools into said container, means in said container for assembling said glass fibres into a bundle, molding tube means associated with said container for receiving said glass fibre bundle at one end, sectionalized means for heating said glass fibre bundle and accompanying plastic within said molding tube means to initiate hardening of said plastic and for subsequently and independently heating a rod formed from said bundle and said plastic leaving said molding tube means at the other end thereof to finish the hardening of said plastic, means for drawing said rod forward in a continuous operation, and means for cutting said rod into desired lengths.

References Cited in the file of this patent
UNITED STATES PATENTS

| | | |
|---|---|---|
| 1,421,306 | Rawlings | June 27, 1922 |
| 2,625,498 | Koch | Jan. 13, 1953 |
| 2,684,318 | Meek | July 20, 1954 |